(12) United States Patent
Vacchi et al.

(10) Patent No.: US 12,481,524 B2
(45) Date of Patent: Nov. 25, 2025

(54) UNIFORM ADDRESSING IN BUSINESS PROCESS ENGINE

(71) Applicant: RED HAT, INC., Raleigh, NC (US)

(72) Inventors: Edoardo Vacchi, Milan (IT); Tiago Dolphine, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 663 days.

(21) Appl. No.: 17/556,453

(22) Filed: Dec. 20, 2021

(65) Prior Publication Data

US 2023/0195514 A1 Jun. 22, 2023

(51) Int. Cl.
*G06F 9/48* (2006.01)
*G06F 9/50* (2006.01)
*G06Q 10/10* (2023.01)

(52) U.S. Cl.
CPC ......... *G06F 9/4881* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 7,174,338 B2 | 2/2007 | Leymann et al. | |
| 8,719,215 B2 | 5/2014 | Leymann et al. | |
| 11,113,307 B2 | 9/2021 | Abrams | |
| 2011/0307619 A1* | 12/2011 | Ogura | H04L 51/214 709/228 |
| 2017/0272400 A1* | 9/2017 | Bansal | H04L 41/0806 |
| 2019/0372850 A1* | 12/2019 | Fandli | H04L 63/12 |
| 2021/0064442 A1* | 3/2021 | Alluboyina | G06F 9/5011 |
| 2021/0240542 A1* | 8/2021 | Nguyen | G06F 9/5083 |
| 2022/0269520 A1* | 8/2022 | Yamamoto | G06F 9/45533 |

OTHER PUBLICATIONS

BMC Software, Inc., "Creating Process Steps or Activities", 2005-2021, 11 pages, https://docs.bmc.com/docs/helixplatform/creating-process-steps-or-activities-851870316.html.
"Enterprise-First Automation and Application Modernization Using Kogito", 2021, 15 pages, https://radiant.digital/enterprise-first-automation-and-application-modernization-using-kogito/.
Narendra, et al., "Towards a Unified Approach for Business Process Modeling Using Context-based Artifacts and Web Services", 2009, 8 pages, https://ieeexplore.ieee.org/document/5283942.
"Communicating Business Processes Using Correlations", 7 pages, https://docs.oracle.com/middleware/12212/bpm/bpm-develop/GUID-ED13C54C-888C-4295-B244-AE4A64FBFD2F.htm#BPMPD11057.
Meyer, "Automating Data Exchange in Process Choreographies", Hasso Plattner Institute at the University of Potsdam; Eindhoven University of Technology, 2014, 16 pages, https://link.springer.com/content/pdf/10.1007/978-3-319-07881-6_22.pdf.

\* cited by examiner

*Primary Examiner* — Mustafa A Amin

(74) *Attorney, Agent, or Firm* — Dority & Manning, P.A.

(57) ABSTRACT

Systems and methods for uniform addressing can include receiving a request to execute a component of an application and assigning a component identifier to the component of the application. It could also include determining a component type identifier of the component and responsive to a determination that the component is instantiated, assigning a component instance identifier to an instance of the component. It could further include invoking the component by a global address comprising the component type identifier and at least or of the component identifier and component instance identifier.

14 Claims, 7 Drawing Sheets ered, in accordance with some implementations.

UNIFORM ADDRESSING IN BUSINESS PROCESS ENGINE

TECHNICAL FIELD

The disclosure is generally related to enterprise process management engines, and more particularly, to addressing schemes for application components within enterprise process management engines.

BACKGROUND

An enterprise process engine may be a programming framework allowing the creation, execution and maintenance of process flows. For example, it can facilitate communication between disparate data and process sources distributed across one or more applications and services. It can also provide enterprises process interaction between the disparate elements distributed across remote locations. In some instances, an enterprise process engine can automate linking processes and their respective activities within an enterprise information technology environment. Enterprise process engines may be used to oversee the integration, interlinking, and interprocessing in the technical architecture of enterprise processes. In some cases, an enterprise process engine will work with various different application infrastructure layers such as the front end, middleware, backend and external applications. It facilitates the integration of the processes occurring at the different layers, intersystem and intrasystem communication, as well as process data routing, data transformation, and merging.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
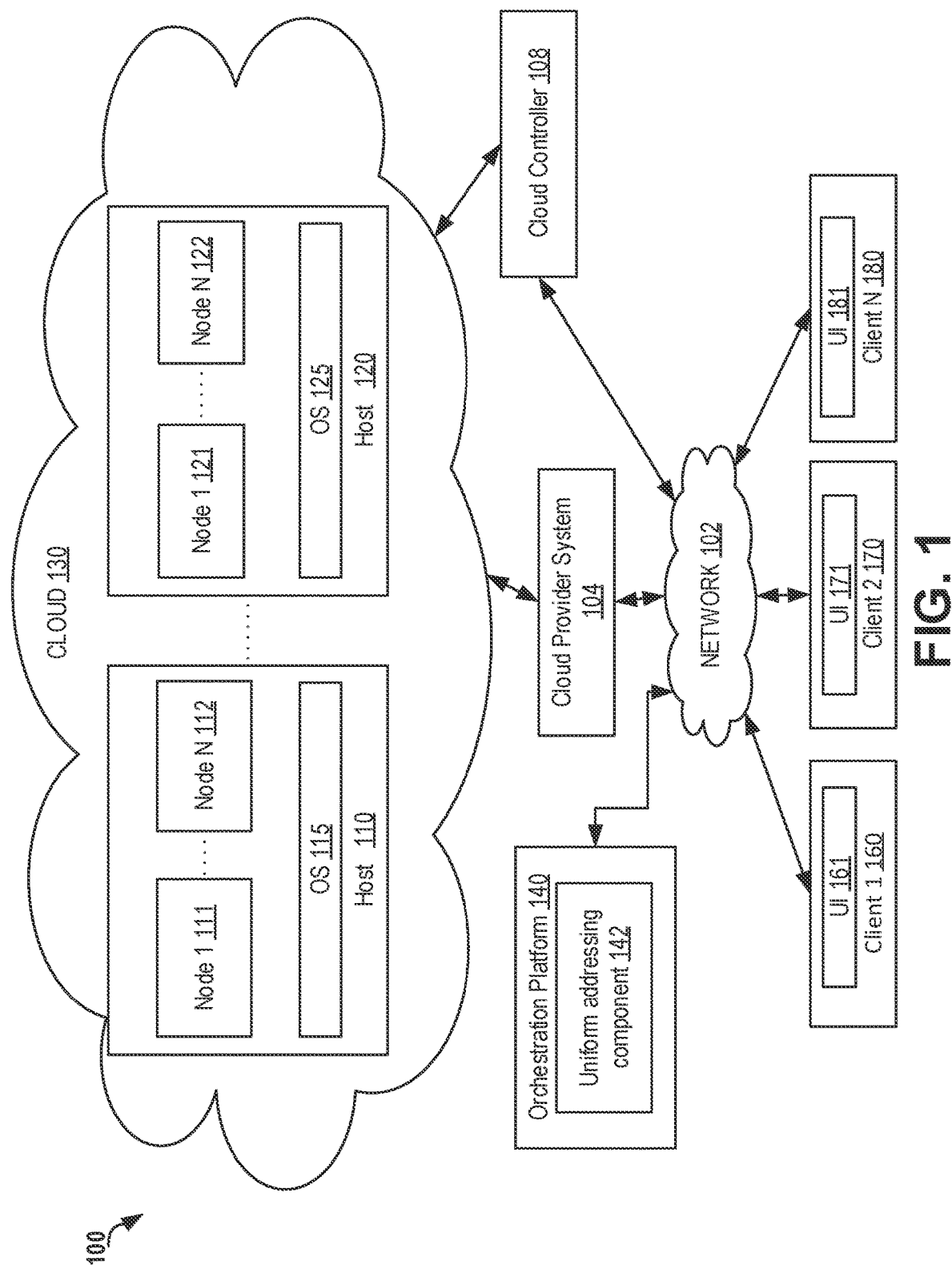
FIG. 1 depicts a block diagram of an example network architecture, in accordance with one or more implementations of the disclosure.

Described herein are systems and methods for implementing uniform global addressing for applications and their constituent components (i.e., portions, sub-portions, etc.) within localized and distributed settings of enterprise process engines. Such applications can be developed in a containerized software development environment by multiple entities (e.g., different developers) for execution within an enterprise process engine. A container may be an execution environment represented by an isolated virtualized user-space instance of an operating system. The containers may be employed to store the software application code and micro-services (e.g., a utility program such as a compiler) for performing operations on the software code. A micro-service may be an independently-deployable modular service that may communicate with other services in a system (e.g., a cloud-based system) through a lightweight interface. The code of the software application may be stored along with micro-services in containers to create containerized applications. The containerized application may be released as software product that can be executed by the enterprise process engine as a self-contained application on computing nodes in a cloud (i.e., a distributed computing system having resources located at different location). Each of the computing nodes (e.g., a host computer, a virtual machine, etc.) may support a container execution environment.

In some embodiments, an application may be deployed as a plurality of services (e.g., micro-services) on one or more of the computing nodes. Such an application may be included as part of a model within an enterprise process engine that can execute process-based applications (i.e., applications that implement workflows). A process model may be a representation of an end-to-end sequence of activities or tasks within a process. Execution of a process model may involve executing its constituent tasks in the order described by the model (e.g. sequentially or in parallel, depending on the diagram of the process).

An instance of a process model can be a runtime representation in the executing system (i.e., a runtime image of the process model that is being executed by the process engine). For example, an enterprise process can be instantiated and can run with different parameters and can be in a different state at any given time. The state of an enterprise process instance represents the state of the execution flow of the enterprise process at a particular time. Therefore, in order to develop, execute, and operate the application in the enterprise process engine, it can be often useful to refer to components of the application such as processes, sub-processes (e.g., tasks), and other sub-components of the application and its constituent services as well as their respective instances through identifiers.

Each of the application services, processes, and sub-components may be hosted by one or more containers. Each of the containers and the resources used to execute the components of the application and their respective sub-components can be located at disparate physical locations (i.e., deployed in a distributed fashion across a distributed network of computing resources). Within the context of a container orchestration platform operating an enterprise process engine, any constituent component of an application or any of its sub components may operate as a container. Even the most elemental component of an application (i.e., the most basic task or sub-component that is not further sub-divisible into discrete routines) can be containerized. A common feature of such enterprise automation platforms is that their runtime engines (e.g., enterprise process engines, rules engines) spawn child executions (e.g., executions of processes and other sub-components) each of which may require the evaluation of a sub-component to be completed prior to proceeding with its remaining operations. Accordingly, in many cases the evaluation of a component of the application may need to pause awaiting the result of a pending operation.

Thus, enterprise automation engines benefit from being able to refer to these potentially nested components (e.g., processes, sub-processes, tasks, sub-components) of an application and their respective instances. However, conventional approaches refer to application components locally and in the context of a monolithic application. Such methods often use identification and addressing schemes that do not differentiate between application component and their respective instances. Furthermore, conventional approaches do not account for various components of an application being deployed and located at disparate locations of a distributed network and use identification and addressing schemes that are defined only with respect to a local operating environment. This results in additional computing resources as well as processing and development time being consumed to translate local references and addresses into formats configured to be used by components of an application deployed remotely across a distributed platform. More particularly, for example, in order to invoke another component of an application, a portion of an application may employ additional tables and definitions correlating a definition used in the context of one location or operating environment with that used in the context of another.

Aspects of the disclosure address the above-described and other deficiencies by providing mechanisms (e.g., systems, methods, machine-readable media, etc.) for implementing a uniform addressing scheme to identify and refer to various components of an application univocally and unambiguously regardless of whether they are deployed locally or remotely. Implementations of the present disclosure can relate (i.e., establish associations between) models (e.g., of processes, sub-processes, tasks) and their respective instances. The addressing scheme can be employed to refer to parts of a model such as a particular task within an enterprise process. Notably, a process can invoke another process or a sub-process. Accordingly, the implementations of the present disclosure can unambiguously refer to an arbitrarily deep-nested item of a child sub-process of an application. In the context of the abovementioned container orchestration platform, each container can be exposed to other containers and processes as a service (i.e. each logical container is accessible by components of the application and other applications outside of its local operating environment). The technical benefit provided by implementations of the present disclosure is that the processes and other sub-components of an application can be reached and referred to from different locations and operating environments using a univocal addressing scheme that is uniform and does not require further translation. This is in contrast to conventional approaches where containers or components of an application are only visible within a local network or a local operating environment.

As explained in more detail below, implementations of the present disclosure enable different containerized processes of an application to communicate with and refer to each through a unified cross-service identifier. In some implementations, the processes can be deployed at different physical locations and within different operating environments. In other implementations, the one of the processes can be nested within the other. To provide context for the various implementations and the use of the uniform addressing scheme, an example network architecture is initially described below.

FIG. 1 is a block diagram of a network architecture 100 in which implementations of the disclosure may operate. In some implementations, the network architecture 100 may be used in an enterprise process management systems using a container orchestration platform, such as Kubernetes®. The enterprise process management system can provide resources and services (e.g., micro-services) for the development and execution of applications owned or managed by multiple users using enterprise automation frameworks. An enterprise process management system can provide a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-user and multi-tenant systems.

As shown in FIG. 1, the distributed computing system 100 may include a cloud-computing environment 130 (also referred to herein as a cloud) that includes computing nodes 111, 112, 121, 122 to execute applications and/or sub-components (e.g., processes, sub-processes, tasks etc.) associated with the applications. A "computing node" providing computing functionality may provide the execution environment for an application of the enterprise process management system. In some implementations, the "computing node" may refer to a container or virtual machine (VM) that is hosted on a physical machine, such as host 1 110 through host N 120, implemented as part of the cloud 130. In some implementations, the host machines 110, 120 can be located in a data center. For example, both computing nodes 111 and 112 can be hosted on the same physical machine 110 in cloud 130 provided by cloud provider 104. In other implementations, different processes of the same application can be deployed to computing node N 112 and computing node 1 121 with each node being hosted being hosted by different physical machines 110 and 120 and respectively located in disparate geographic locations and within different local networks. In some implementations, an environment other than a container or VM may be used to execute functionality of the enterprise process management system applications. When computing nodes 111, 112, 121, 122 are implemented as containers or VMs, they may each be executed by respective operating systems (OSs) 115, 125 on each respective host machine 110, 120.

In some implementations, the host machines 110, 120 may be located in the same data center while in other implementations, the host machines 110, 120 can be located in different data centers in remote physical locations from each other. Users can interact with applications executing on the cloud-based computing nodes 111, 112, 121, 122 using client computer systems, such as clients 160, 170 and 180, via corresponding user interfaces (e.g., web browser applications) 161, 171 and 181.

Clients 160, 170, and 180 can be connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from the enterprise process management system's container orchestration platform 140. In response to these commands, the cloud controller 108 can provide data associated with different applications to the cloud provider system 104.

Figure 6:
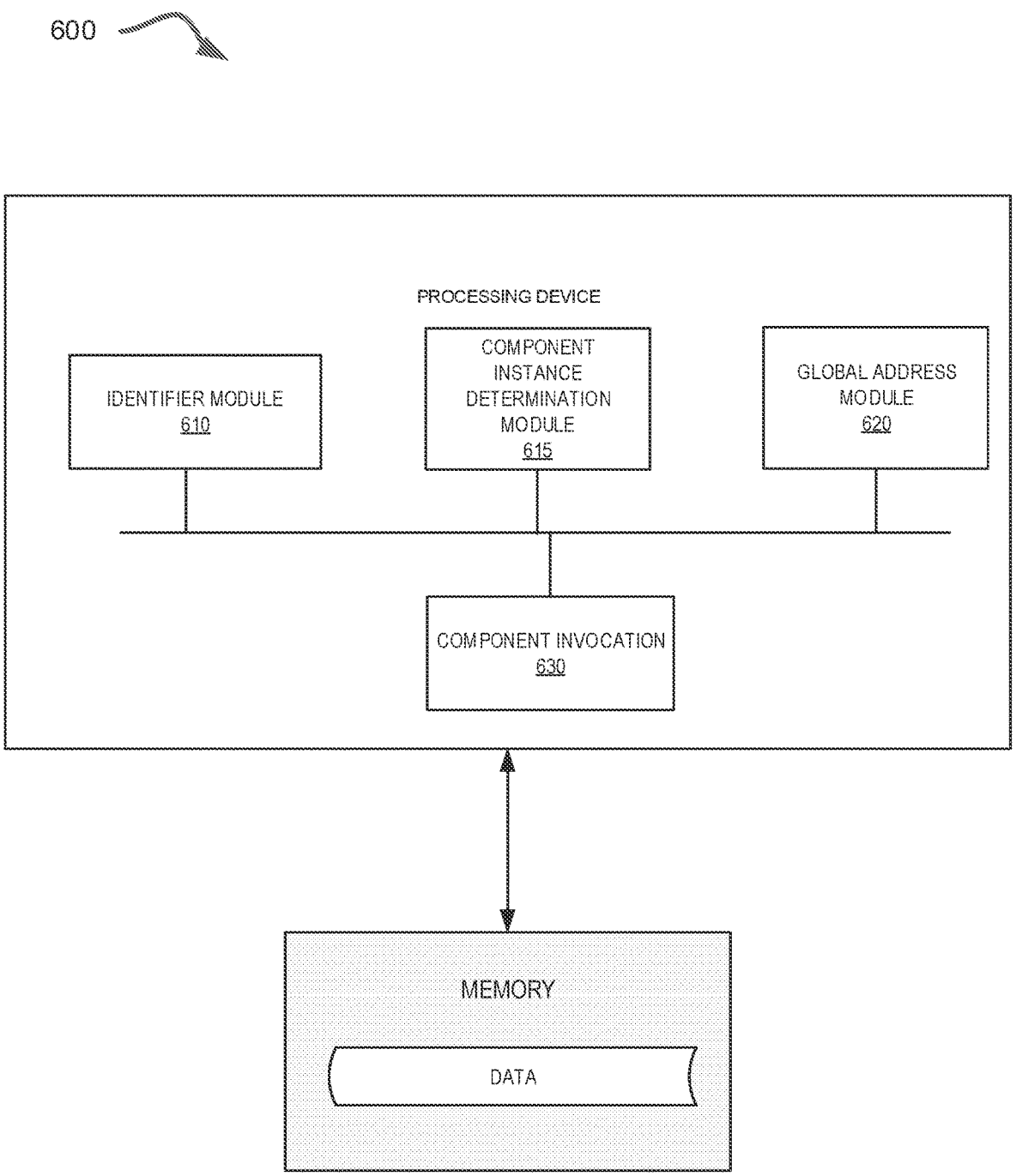
FIG. 6 depicts a block diagram of an example computer system in accordance with one or more implementations of the present disclosure.

Orchestration platform 140 may provide management and orchestration functions for deploying and/or managing applications and/or services in system 100. For example, orchestration platform 140 can build one or more container images for providing functionality of the application and/or the service. The orchestration platform 140 can then create one or more containers to host the application and/or service (e.g., by instructing one or more nodes 111, 112, 121, 122 to instantiate one or more containers from the container image(s)). Orchestration system 140 can include one or more computing devices (e.g., a computing device as shown in FIG. 6). Orchestration platform 140 can implement an application programming interface (e.g., a Kubernetes API) to facilitate deployment, scaling, and management of containerized software applications.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application.

In some embodiments, orchestration system 140 can deploy an application as one or more services on one or more computing nodes. Each of the services may be deployed in one or more containers.

In some implementations, the orchestration platform 140 can include a uniform addressing component 142 which can reside on one or more machines and implement the uniform addressing scheme described herein. For example, the uniform addressing component 142 can use a uniform addressing scheme to generate and assign names as well as identifiers to an application and any of its constituent components deployed to be executed on the computing nodes 111, 112, 121, 122. In some implementations, the uniform addressing component 142 can assign an identifier to an application which defines the name of the application. It can also assign or indicate a port associated with a host (e.g., host 110, 120) to be used to reference or invoke a particular sub-component of the application. Further, the uniform addressing component 142 can define and assign general identifiers for uninstantiated sub-components (e.g., process, sub-process, task) of an application and specific unique identifiers for instances of such sub-components (e.g., an instantiated process, sub-process, task).

In some embodiments, the uniform addressing component 142 can include one or more components described in connection with FIG. 6 and can implement one or more methods described in connection with FIGS. 2-5. While various implementations are described in terms of the environment described above, the functionality may be implemented in a variety of other environments including a single, monolithic computer system, as well as various other combinations of computer systems or similar devices connected in various ways. For example, the uniform addressing component 142 may be running on a computing node, such as computing nodes 111, 112, 121, 122, of the system 100 hosted by cloud 130, or may execute external to cloud 130 on a separate server device. In some implementations, the uniform addressing component 142 may include more components that what is shown that operate in conjunction with the enterprise process management system of network 100.

In some implementations, the identifiers of application components or any of their subcomponents can be represented as Uniform Resource Identifiers (URIs) by the uniform addressing component 142 in the form <scheme>:// <app-identifier>[@host:port]/<path> where: (i) <scheme> can be defined by the development framework used by the orchestration platform 140 (e.g., the some projects may use kogito); (ii) <app-identifier> can be a user-specified name or other identifier that can refer to the application in which all constituent processes and subsequent subcomponents are rooted; (iii) [@host:port] can be an indicator of a host machine and a port through which it is to be accessed for invoking a particular application component when necessary for access from outside a local network and operating environment (i.e., this part of the identifier can be optionally used when communication occurs across two or more remote hosts); and (iv) /<path> can be a specific resource address path that can be structured analogously to, but not correspond to, a UNIX file-system path and it is described in more detail below.

In some implementations the <path> portion of the URI generated by the uniform addressing component 142 can include the univocal uniform address of any of the specific sub-components of an application deployed on the computing nodes 111-122 of the distributed computing cloud 130. For example, the <path> can point to a particular local resource. In an implementation, it starts with a leading slash and the string "processes" to indicate that the resource being referred to is a process of the application. Then, the "processes" string can be followed by another slash and a <process-id> where the <process-id> can be an identifier of a specific process model (i.e., a particular type of process within the application). Accordingly, for a particular process, the <path> portion (referred to as the "path" herein) can take the general form of: /processes/<process-id>. In one example, for a process called "onboarding", the path can take the specific form of: /processes/onboarding, where <process-id> of an onboarding process within the application is "onboarding".

As noted above, in some implementations, each component of an application can be instantiated. An instance of an application component such as, for example, a process is the runtime image of a process model. Accordingly, in some of the implementations, an identifier assigned by the uniform addressing component 142 to a process instance within the path can include the string "instance" to indicate that a following string can indicate an instance of the process identified by the preceding string. For example, the string "instance" can be followed by an "instance-id" with the resulting path having the general form of: /processes/<process-id>/instances/<process-instance-id>. The process instance ID can be a unique runtime-bound identifier (i.e., pointer to a unique component that is being executed at a given point in time) for the running instance of the process (e.g., a random universally unique identifier (UUID)). Accordingly, the path can be constructed such that there is a 1:1 correspondence between a particular running instance of a process and the identifier referring to the instance of the process. For example, the uniform addressing component 142 can assign an instance of the aforementioned onboarding process the unique identifier "46cc9a7a-2364-4d40-a321-4f3a2c580fe7" such that the path for addressing that instance of the process becomes: /processes/onboarding/instances/46cc9a7a-2364-4d40-a321-4f3a2c580fe7.

Further, in the various implementations, an application can include an arbitrary number of components (e.g., processes) and sub-components (e.g., sub-processes, tasks) each of which can have an arbitrary number of nested-sub components within them. An executable element of an application such as a process, sub-process, task, or any such component and sub-component of an application can be referred to herein as an executable component. Accordingly, an executable component can be a component of an application at any arbitrary level of the hierarchy of components within the application, from the most elemental (e.g., tasks, which are not further sub-divisible into executable routines) to the most complex (e.g., processes, which can have an arbitrary number of nested sub-divisible sub-processes and sub-components). Thus, each process of an application can include multiple sub-components (e.g., tasks). Each of these sub-components can be referenced by the uniform addressing component 142.

In a manner similar to the naming and identification of the processes, the uniform addressing component 142 can assign an identifier to any component of any process of the application. Accordingly, the components can be referred to in the process model by an identifier. For example, the path within the URI can be expanded to include the string "nodes" indicating that a following string can indicate a type of component. The "nodes" string can be combined with a "node-id" with the resulting path having the general form of: /processes/<process-id>/nodes/<node-id>. For example, the uniform addressing component 142 can assign a node-id of my-enterprise-rule-task to a particular component (e.g., task) of the onboarding process of the application such that the path for addressing that component becomes: /process/onboarding/nodes/my-enterprise-rule-task.

Furthermore, just like processes, the sub-components of the processes (i.e., sub-processes, tasks) can be instantiated and have runtime instances within the running application. Accordingly, the path of a particular component can be expanded to refer to a specific instance of that component. In some implementations, the string "instance" can be followed by an "instance-id" and combined with the aforementioned path of the component to result in a path that has the general form of: /processes/<process-id>/nodes/<node-id>/instances/<node-instance-id>. For any component, the component instance ID can be a unique runtime-bound identifier (i.e., pointer to a unique component that is being executed at a given point in time) for the running instance of the component (e.g., a random universally unique identifier (UM)). For example, the uniform addressing component 142 can assign an instance of the my-enterprise-rule-task a UM of ed9febd6-54f0-475d-a257-294de4a10496 such that the path for addressing that instance of the component becomes: /processes/onboarding/nodes/my-enterprise-rule-task/instances/ed9febd6-54f0-475d-a257-294de4a10496.

Considering that instances of a component in a process are runtime images of the component (i.e., a representation of the state of the component at a point in time) of a process, in some implementations the instances of a component exist as part of an instance of a process. Accordingly, a semantically valid path can be constructed by combining (e.g., appending, concatenating, merging) the path of the component instance with the path of the parent process instance. Thus, the uniform addressing component 142 can generate a path that incorporates both the identifier of the process instance as well as the identifier of a constituent component instance that has the general form of: /processes/<process-id>/instances/<process-instance-id>/nodes/<node-id>/instances/<node-instance-id>. Accordingly, if an onboarding process incorporates within it (i.e., has nested inside of it) a set of tasks one of which is called "my-enterprise-rule-task" and is instantiated, a path addressing an instance of that rule having an instance ID of ed9febd6-54f0-475d-a257-294de4a10496 can be: /process/onboarding/tasks/my-business-rule-task/instances/ed9febd6-54f0-475d-a257-294de4a10496.

The string "instances" serves to indicate that a subsequent string can contain an instance identifier. However, this indication may not be necessary in all cases, such as in situations where the only subsequent string is an instance identifier. Accordingly, in some implementations, the string "instances" can be omitted within a path, and an instance identifier string can immediately follow a string indicating a process or sub-component type (e.g., a "sub-component" or "node" string). Thus a general form of the aforementioned path that omits the "instances" string before the identifier of a component instance can be the following: /processes/<process-id>/instances/<process-instance-id>/nodes/<node-id>/instances/<node-instance-id>. In one example, an onboarding process instance with an instance ID of 46cc9a7a-2364-4d40-a321-4f3a2c580fe7 can incorporate a task called "my-enterprise-rule-task" that is instantiated and has an instance ID of ed9febd6-54f0-475d-a257-294de4a10496. Accordingly, a path addressing an instance of that task that omits the "instances" string before the identifier can be: /process/onboarding/instances/46cc9a7a-2364-4d40-a321-4f3a2c580fe7/tasks/my-enterprise-rule-task/ed9febd6-54f0-475d-a257-294de4a10496. Similarly, where it is not necessary to indicate a type of component within the address, the "node-id" string (i.e., the component identifier) can be omitted. Thus, the foregoing path generated by the uniform addressing component 142 can to address that particular instance of the task can omit the task identifier of "my-enterprise-rule-task" and have the form of: /process/onboarding/instances/46cc9a7a-2364-4d40-a321-4f3a2c580fe7/nodes/ed9febd6-54f0-475d-a257-294de4a10496. In some implementations, where an element identifier within the path contains a separator such as a separator '/' an alternative URL encoding can be used to ensure that the separator within the identifier is not mistaken as an element separator within the syntax of the path. A more detailed explanation of an example assignment and use of identifiers according to the unified addressing scheme of the various implementations of this disclosure is provided in the following description.

Figure 2:
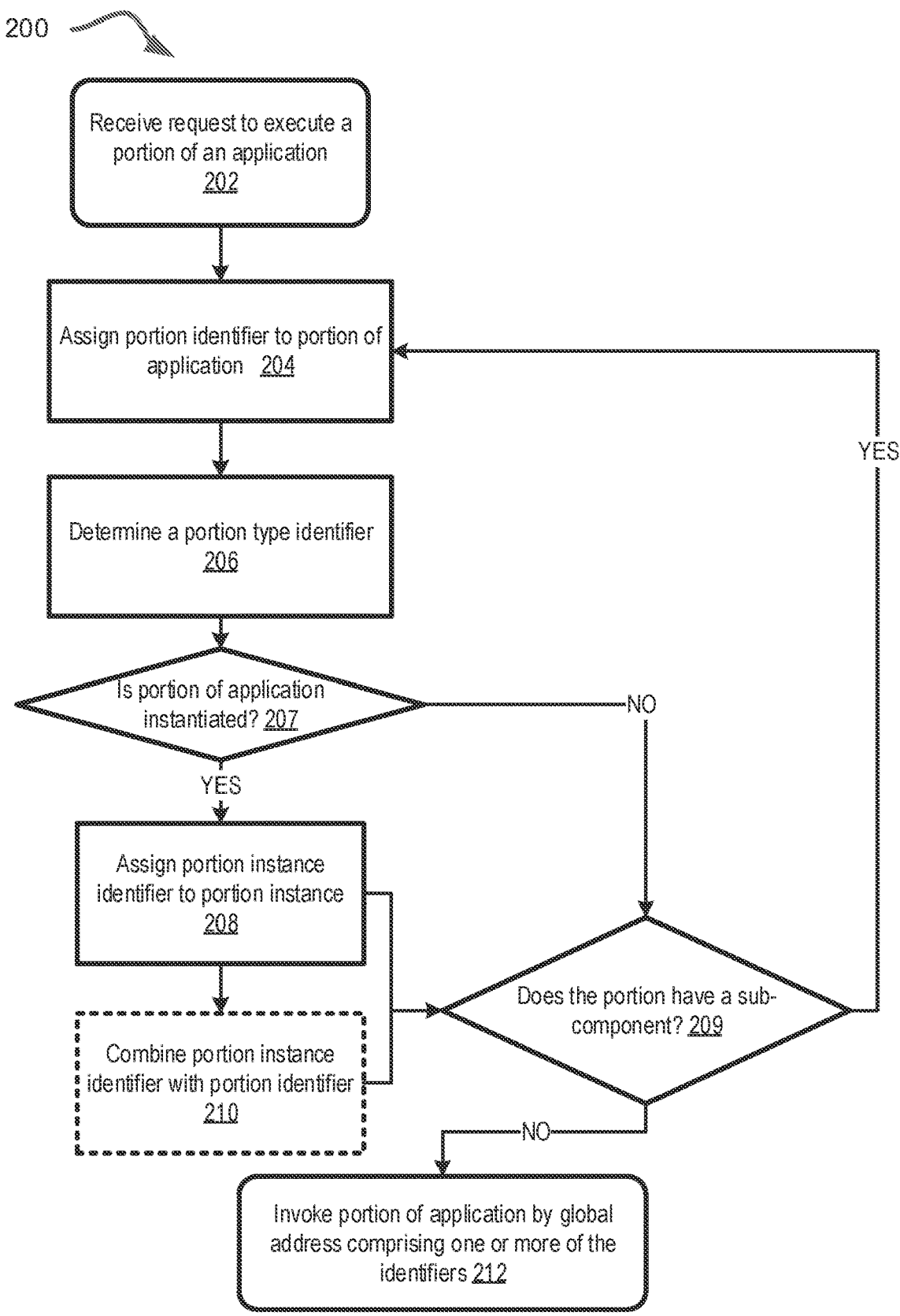
FIG. 2 depicts a flow diagram of an example method for providing a global addressing scheme, in accordance with some implementations.

The procedure for creating the identifiers according to the uniform addressing scheme from a model of an application is described with reference to FIG. 2. FIG. 2 depicts a flow diagram of an example method 200 for providing a global addressing scheme, in accordance with some embodiments. In some implementations, at block 202 the processing logic can receive a request to execute a component of an application. For example, at block 202, the request can initiate an application and a process runtime can be started by the processing logic. When the process runtime is started, the processing logic can generate a URI. The processing logic can assign a system application identifier to the addressing scheme of the URI and assign a host/port pair by reading configuration data containing settings for each option or by using pre-determined default values. In one example, a URI of the form <scheme>://<app-identifier>[@host:port]/<path> using the "kogito" scheme for an application called "my-app" accessible at a host called "localhost" via port "54321" can be represented as: kogito://my-app@localhost:54321.

When an application model is loaded and its constituent processes and sub-components (i.e., sub-processes, tasks) are requested to be run, each component and sub-component of the application can be instantiated in a recursive manner. Because processes can have man nested sub-components, each sub-component within each component can be instantiated one by one. Accordingly, each component within each application component can be executed and have a running instance addressable by the uniform addressing scheme. Each component or sub-component of an application can be referred to here as an application component.

Thus, at block 204, the processing logic can assign a component identifier to a component of an application. Similarly, at block 206, the processing logic can assign a component type identifier to a component of an application. A component of an application can be any executable element or sub-component of an application (e.g., process, sub-process, task). A component type identifier in block 206 can be any category into which the component of an application can be classified. The component identifier of block 204 can be a name of the particular component of the type assigned in block 206. Accordingly, the processing logic can generate a global uniform address by combining, at block 206, the application component identifier with the application component type identifier. The combination can be performed by appending, concatenating, merging or otherwise linking the application component identifier with the application component type identifier to generate the global unified address for a particular application component. Accordingly, in one example, for a process (i.e., application component) of an application called "my-app" having a process identifier of "my-process-id", a global uniform address may be: kogito://my-app@localhost:54321/processes/my-process-id/where the application component type "process" and the application component identifier "my-process-id" are combined and appended to the preceding strings to form the global uniform address of the process.

In one example, the processing logic can assign a local unique application component identifier and the application component type identifier to the application component (e.g., a process) depending on the application component name and other internal identifiers defined by an application component specification or runtime-specific logic. In this example, the application component identifier can be combined with the application component type identifier and the previous strings in the global address by concatenation. In this manner, as described above, the process identifier "my-process-id" can be concatenated with the/processes path prefix to generate the uniform address of kogito://my-app@localhost:54321/processes/my-process-id/. Analogously, for each sub-component of any of the components of the application, identifiers can be created, assigned, and combined with preceding strings to create the sub-components global uniform address. The creation and use of the global uniform address for sub-components of components of an application will be described in more detail below with reference to FIG. 3.

In some implementations, at block 207, the processing logic can determine whether the component of the application is instantiated. This may include the processing logic determining whether or not there is a running instance of a particular component of an application (i.e., whether or not there is a runtime representation of a component of an application). In one implementation, in response to determining that the component of the application is instantiated at block 207, the processing logic can, at block 208, assign an instance identifier to the instance of the application component. For example, the processing logic can assign a unique identifier to the instance (i.e., runtime representation) of the application component (e.g., a process) depending on the application component name and other internal identifiers defined by an application component specification or runtime-specific logic. The processing logic can also combine (e.g., by appending, concatenating, merging, linking, etc.), at block 210, the component instance identifier with the component identifier. In this example, the instance identifier can be combined with the previous strings by concatenation with the /instances prefix and appended to the preceding strings in the global uniform address. Accordingly, in one example, an instance of the "my-process-id" process can be assigned the instance identifier "4bc52525-4b73-47ad-9bb8-232f79505901" and combined with the previous strings to generate the global uniform address: kogito://my-app@localhost:54321/processes/my-process-id/instances/4bc52525-4b73-47ad-9bb8-232f79505901.

In some implementations, the processing logic can determine, at block 209, whether or not the component of an application has any sub-components. A sub-component can be any component of an application nested within the component of an application (e.g., a process, sub-process, task etc.). In some implementations, the processing logic can, at block 212 execute a component of an application using the global uniform address of the application component. The processing logic can, at block 212, execute the application component by reading or referring to a string of the global address that includes the component type identifier, the component type identifier, the component instance identifier or any combination of the aforementioned identifiers. Responsive to determining, at block 209, that an application component has a sub-component, the processing logic can perform operations analogous to those of 204-212 as described in more detail below with reference to FIG. 3.

Figure 3:
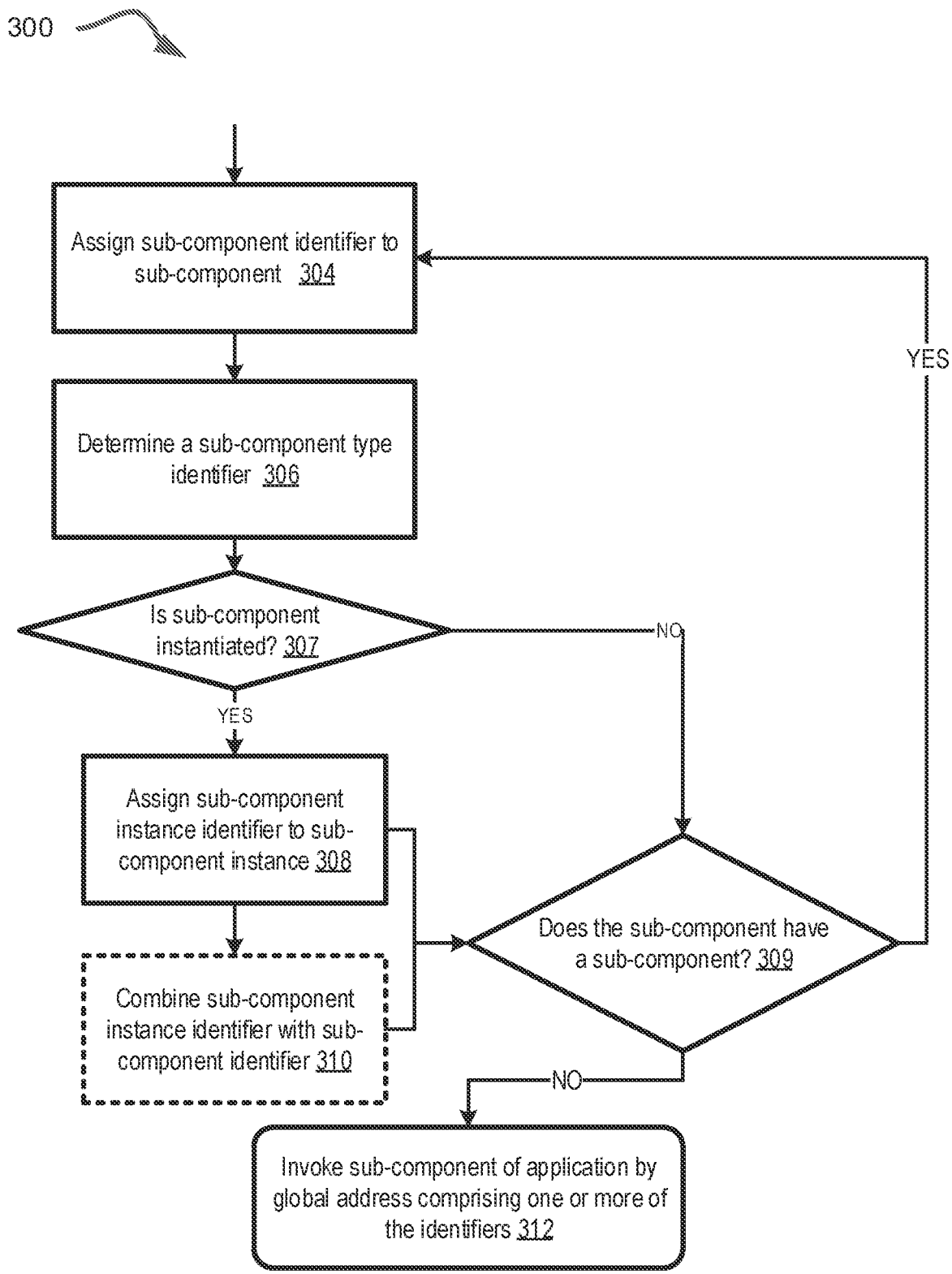
FIG. 3 depicts a flow diagram of an example method for providing a global addressing scheme, in accordance with some implementations.

An extension of the procedure for creating the identifiers according to the uniform addressing scheme from a model of an application is illustrated in FIG. 3 which depicts a flow diagram of an example method 300 for providing a global addressing scheme, in accordance with some embodiments. As noted earlier, a component of an application can have sub-components that can be executed during the process of executing the component of the application. Accordingly, in some implementations, the request to execute a component of an application received by the processing logic at block 202, can explicitly or implicitly include a request to execute sub-components of the component of an application. Responsive to the processing logic determining, at block 209, that an application component has a sub-component, the processing can, at block 304, the processing logic can assign a sub-component identifier to a sub-component of an application (i.e., a sub-component of a component of the application). Similarly, at block 306, the processing logic can assign a sub-component type identifier to a sub-component of an application.

A sub-component of an application can be any constituent component of an application (e.g., process, sub-process, task). A sub-component type identifier in block 306 can be any category into which the sub-component of an application can be classified. The sub-component identifier of block 304 can be a name of the particular sub-component of the type assigned in block 306. Accordingly, the processing logic can generate a global uniform address by combining, at block 306, the application sub-component identifier with the application sub-component type identifier. The combination can be performed by appending, concatenating, merging or otherwise linking the application sub-component identifier with the application sub-component type identifier to generate the global unified address for a particular application sub-component. For example, the processing logic can assign an application sub-component the sub-component type identifier "workitems" and a sub-component identifier "send-mail". Accordingly, in one example, if this sub-component is within a process having an identifier of "org.kie.kogito.examples.MyProcess" of an application identified as "my-app", a global uniform address for the application process sub-component may be: kogito://my-app@localhost:54321/processes/org.kie.kogito.examples.MyProcess/workitems/send-email where the sub-component type "workitems" and the application sub-component identifier "send-mail" are combined and appended to the preceding strings to form the global uniform address of the sub-component.

In some implementations, the processing logic can assign a local unique sub-component identifier and the sub-component type identifier to the sub-component (e.g., a process, a sub-process, a task, etc.) depending on the sub-component name and other internal identifiers defined by a sub-component specification or runtime-specific logic. In some example, the sub-component identifier can be combined with the sub-component type identifier and the previous strings in the global address by concatenation.

In some implementations, at block 307, the processing logic can determine whether the sub-component of a component of the application is instantiated. This may include the processing logic determining whether or not there is a running instance of a particular sub-component (i.e., whether or not there is a runtime representation of a component of an application). In one implementation, in response to determining that the sub-component of a component of the application is instantiated at block 307, the processing logic can, at block 308, assign an instance identifier to the instance of the sub-component. For example, the processing logic can assign a unique identifier to the instance (i.e., runtime representation) of the sub-component (e.g., a task). The processing logic can also combine (e.g., by appending, concatenating, merging, linking, etc.), at block 310, the sub-component instance identifier with the sub-component identifier.

In this example, the instance identifier can be combined with the previous strings by concatenation with the/instances prefix and appended to the preceding strings in the global uniform address. Accordingly, in one example, an instance of the "send-email" sub-component can be assigned the instance identifier of "38684057-b8df-4aeb-8d9e-d509f14b1ba0" and combined with previous strings pertaining to a process with the identifier of "my-process-id" and process instance identifier "4bc52525-4b73-47ad-9bb8-232f79505901". The resulting global uniform address would be: kogito://my-app@localhost:54321/processes/my-process-id/instances/4bc52525-4b73-47ad-9bb8-232f79505901/workitems/send-email/instances/38684057-b8df-4aeb-8d9ed509f14b1ba0.

However, the processing logic can generate a global uniform address for a sub-component instance without referencing the application component instance of which it is a part. Accordingly each sub-component can have mirror instances (i.e., instances having a path rooted at (i) the application component instance identifier, and at (ii) the application component identifier). For example, the paths in the uniform global address of the aforementioned instance of the "send-mail" sub component expressed as kogito://my-app@localhost:54321/processes/my-process-id/instances/4bc52525-4b73-47ad-9bb8-232f79505901/workitems/send-email/instances/38684057-b8df-4aeb-8d9ed509f14b1ba0 can also be expressed as kogito://my-app@localhost:54321/processes/my-process-id/workitems/send-email/instances/38684057-b8df-4aeb-8d9e-d509f14b1ba0. In the latter expression the instance identifier of the process can be omitted while still universally addressing the particular instance of the sub-component that is part of that process of the application. Similarly, in some implementations, the same sub-component instance can be addressed by omitting the sub-component identifier and the/instances prefix for the sub component but retaining the reference to the parent process instance. Accordingly, in these implementations global uniform address of the sub-component of the previous example can take the form: kogito://my-app@localhost:54321/processes/my-process-id/instances/4bc52525-4b73-47ad-9bb8-232f79505901/workitems/38684057-b8df-4aeb-8d9ed509f14b1ba0.

In some implementations, the processing logic can determine, at block 309, whether or not the sub-component itself has any constituent sub-components. A sub-component can be any constituent component of an executable element of an application nested within the parent sub-component (e.g., a process, sub-process, task, etc.). In some implementations, the processing logic can, at block 312 execute a sub-component using the global uniform address of the sub-component. The processing logic can, at block 312, execute the sub-component by reading or referring to a string of the global address that includes the sub-component type identifier, the sub-component type identifier, the sub-component instance identifier or any combination of the aforementioned identifiers. Responsive to determining, at block 309, that a sub-component has a constituent sub-component, the processing logic can perform repeat the operation of blocks 304-312 for any and all sub-components of all the portions of the application.

Because the structure of the identifiers within the global uniform address permits a univocal identification of an executable component of any level within an application as well as the identification of the instances of the component, the addressing scheme of the present disclosure can be used both in a local and a distributed setting for resource and content addressing. The structure of the identifiers and the paths described above provide information about the particular application component and its relationship to other parts of the application without the need to use metadata for routing purposes. The benefits of the addressing scheme can be seen through some example uses of the identifiers.

For example a set of primitive commands can be applied uniformly to paths having the abovementioned structure so that they can be executed in an enterprise process management engine. Notably, even if the set of commands is minimal, they are non-ambiguous due to the uniform and self-contained nature of the identifier structure. Thus, it is possible to route a <command, identifier> pair to a particular component of an application. In some situations, a separate component can pertain to the storage of process models while another component can pertain to the maintenance of runtime process instances, while yet another component can collect information about available resources.

Accordingly, in one example where the commands LIST and START are defined in a set, the string "LIST/process/onboarding/instances" can return the set of all process instances for the process identifier "onboarding"; while the string "LIST/process/onboarding/instances/46cc9a7a-2364-4d40-a321-4f3a2c580fe7/nodes" can return the set of all component instances for the given process instance identifier. Similarly, in that example, the string "START/process/onboarding/instances/46cc9a7a-2364-4d40-a321-4f3a2c580fe7" can initiate the execution of a process instance; while the string "START/process/onboarding/instances/46cc9a7a-2364-4d40-a321-4f3a2c580fe7/nodes/ed9febd6-54f0-475d-a257-294de4a10496" can initiate the execution of a component instance within the given process instance.

In some implementations, the set of commands can be mapped to a set of messages or communication primitives (e.g., HTTP Verbs, POST, PUT, and GET). Since the structure of the identifiers within the path contains all the information needed to direct the command to the right component it is possible to implement in a variety of different development environments and hardware contexts. Because the path can be concatenated to a full URI, these commands easily translate in a distributed setting, such as a Kubernetes® cluster. For example, the LIST command may be mapped to GET (i.e., method to get a representation of the target resource state), while START may be mapped to POST (i.e., method to create or replace the state of the target resource with the state defined by the representation enclosed in the request) with an optional body request containing a payload representing values for each process variable (i.e., the required input for the process to start).

Another example implementation can be beneficial in situations where it is necessary to bind listeners (i.e., listening operations) or observers (i.e., observing operations) to specific events within an application or system. These events may be emitted by the process engine and they may be related to general status changes (e.g., "the process has started") but also to status updates coming from parts of a process (e.g., a work-item). It is possible to subscribe to such status updates using the process identifiers within the global uniform address to register to such events. For example, one may subscribe to the "/process/onboarding/instances" stream to receive updates on all the instances of the onboarding process. Similarly, one may also subscribe to "/process/onboarding/workitem/add-user" to receive all updates from a specific work-item. In a more specific example, one may subscribe to "/process/onboarding/instances/46cc9a7a-2364-4d40-a321-4f3a2c580fe7/nodes/ed9febd6-54f0-475d-a257-294de4a10496" to receive updates for a specific instance of a specific component in a specific process. The implementations of the global uniform address scheme can be further understood with reference to FIGS. 4A-4B.

Figure 4A:
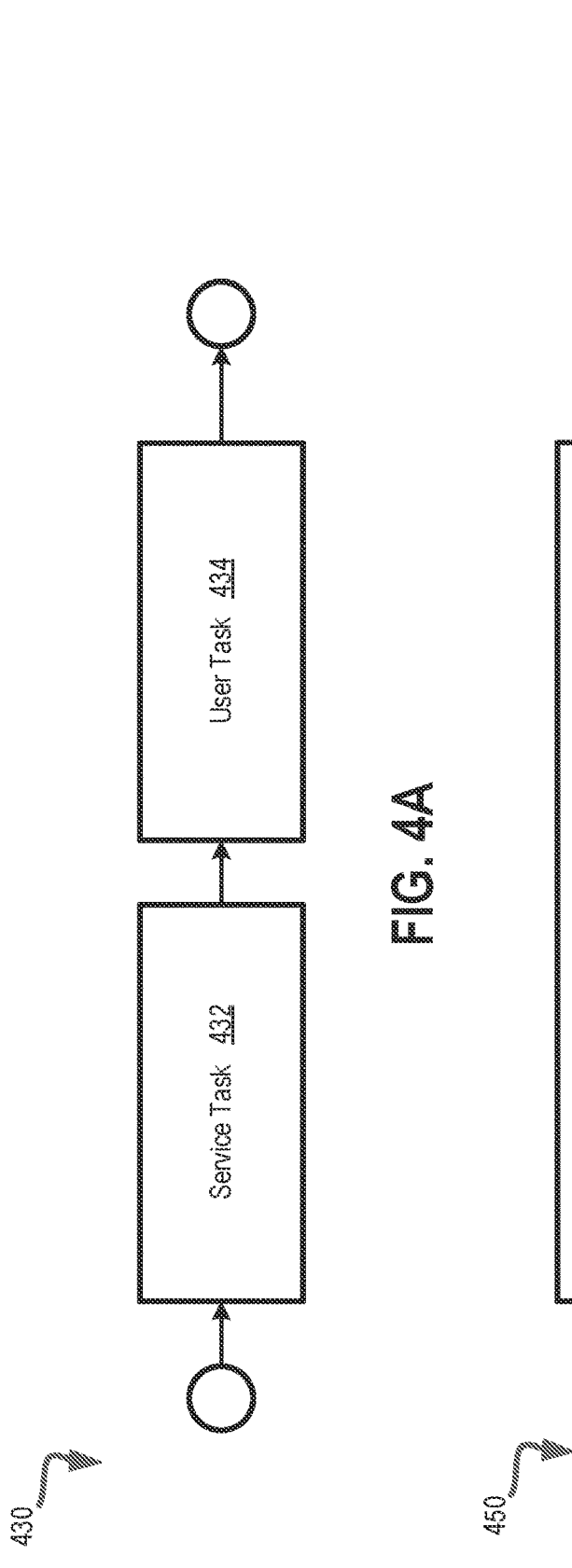
FIG. 4A illustrates a flow diagram of an example process with two tasks addressable by the global addressing scheme, in accordance with some implementations.

FIG. 4A illustrates a flow diagram of an example process with two constituent tasks addressable by the global addressing scheme, in accordance with some embodiments. A process 430 of an application can include two tasks. One component can be service task 432 while the other component can be user task 434. Using the identifiers of "simple-example" for the process 420, the identifier "service-task" for the service task 432 and the identifier "user-task" for the user task 434 a path can be generated for each of the components using the global uniform address scheme. For example, the path for the service task 432 can be "/processes/simple-example/tasks/service-task" and the path for the user task 434 can be "/processes/simple-example/tasks/user-task". Further, if there is a particular instance (e.g., and instance with process instance identifier "b53f84a7") of the process 430 running, a path for a task within that instance of the process can be generated. For example, the path for the service task 432 can be "/processes/simple-example/instances/b53f84a7/tasks/service-task" and the path for the user task 434 can be "/processes/simple-example/instances/b53f84a7/tasks/user-task".

Thus, having a unique identifier for a user task 434 can be particularly beneficial because, on such types of tasks, a process execution usually awaits user input. Such a path, mounted on a "hostname:port" pair, can be exposed as a Representational State Transfer (REST) endpoint, awaiting for user input in the form of POST data (e.g., POST https://some-uri:54321//processes/simple-example/instances/b53f84a7/tasks/user-task, BODY {"some-payload": . . . }.)

Figure 4B:
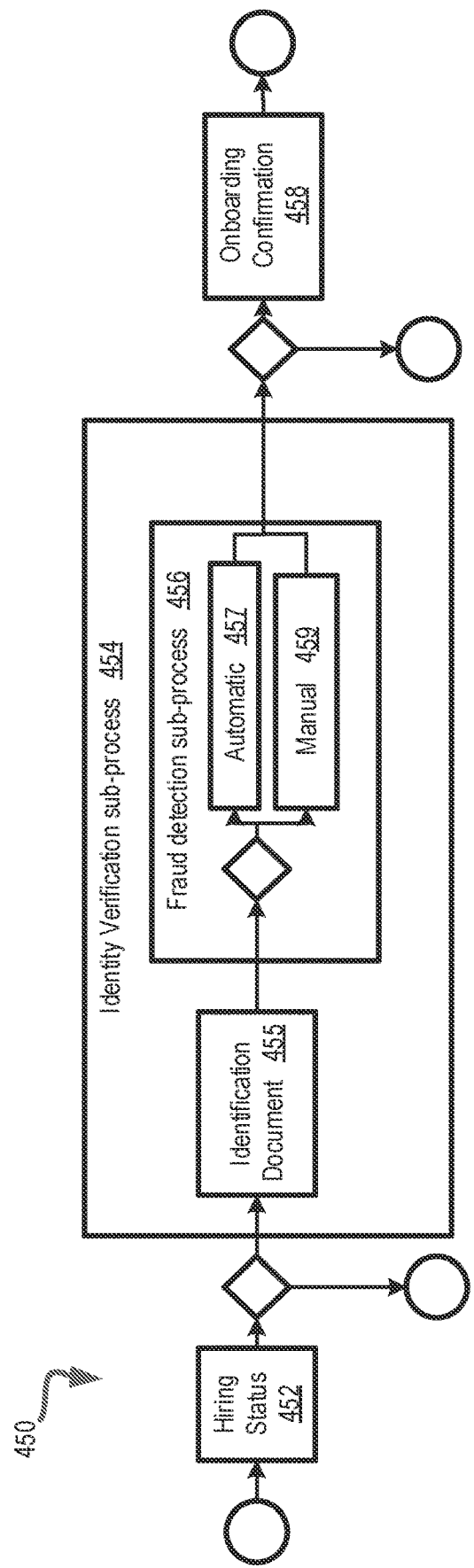
FIG. 4B illustrates a flow diagram of an example process with multiple nested components addressable by the global addressing scheme, in accordance with some implementations.

However, the implementations of the global uniform address scheme can also be implemented in more complex examples. FIG. 4B illustrates a flow diagram of an example process with multiple nested components addressable by the global addressing scheme, in accordance with some embodiments. Depicted in the illustration is a more complex hiring process 450 that include two-level deep nested sub-processes. For example, the hiring process 450 can include a hiring status sub-process 452 where a check of hiring status occurs. The hiring status sub-process 452 can be followed with an identity verification sub-process 454. However, the identity verification sub-process can itself include sub components such as the identification document sub-process 455, which can check an applicant's identification document, and a fraud detection sub-process 456 that can verify that information provided is not fraudulent. Similarly, the fraud detection sub-process 456 can itself have nested sub-components such as the automatic detection task 457 and the manual detection task 459, each respectively implementing a different method of verifying information. Further, the hiring process 450 can include an onboarding confirmation sub-process 458 which may entail the transmission of an onboarding confirmation message to the applicant. The global uniform addressing scheme can be applied in this situation such that the sub-processes are addressed individually as are their nested components. Similarly, it is possible to univocally address the tasks within any of the sub processes.

Accordingly, the paths within a global uniform address can be generated for each of the components of the hiring process 450. For example, the path for hiring process 450 can be "/processes/hiring-process" while the path for the identity verification sub-process 454 can be "/processes/hiring-process/processes/id-verification". Similarly, the path for the identification document sub-process 455 can be "/processes/hiring-process/processes/id-verification/workitems/id-document" while the path for the fraud detection sub-process 456 can be "/processes/hiring-process/processes/id-verification/processes/fraud-detection". In the case that the manual detection option is used, the path for the manual detection task 459 can be "/processes/hiring-process/processes/id-verification/processes/fraud-detection/workites/manual-detection".

Similarly, the paths within a global uniform address can be generated for each instance of each of the components of the hiring process 450. For example, the path for an instance of the hiring process 450 can be "/processes/hiring-process/instances/4bc52525-4b73-47ad-9bb8-232f79505901" while the path for an instance of the identity verification sub-process 454 can be "/processes/hiring-process/instances/4bc52525-4b73-47ad-9bb8-232f79505901/processes/id-verification/instances//a38947b4-db68-11eb-8d19-0242ac130003". Similarly, the path for an instance of the identification document sub-process 455 can be "/processes/hiring-process/instances/4bc52525-4b73-47ad-9bb8-232f79505901/processes/id-verification/instances/a38947b4-db68-11eb-8d19-0242ac130003/workitems/id-document/e2553f0c-db68-11eb-8d19-0242ac130003" while the path for an instance of the fraud detection sub-process 456 can be "/processes/hiring-process/instances/4bc52525-4b73-47ad-9bb8-232f79505901/processes/id-verification/instances/a38947b4-db68-11eb-8d19-0242ac130003/processes/fraud-detection/19f852be-db69-11eb-8d19-0242ac130003". In the case that the manual detection option is used, the path for an instance of the manual detection task 459 can be "/processes/hiring-process/instances/4bc52525-4b73-47ad-9bb8-232f79505901/processes/id-verification/instances/a38947b4-db68-11eb-8d19-0242ac130003/processes/fraud-detection/19f852be-db69-11eb-8d19-0242ac130003/workitems/manual-detection/2bdc3266-db69-11eb-8d19-0242ac130003". Notably, in some implementations, the "/instances" prefix may be omitted between the component identifier and the instance identifier.

By prefixing a "host:port" pair to the beginning of any of the aforementioned path, it is possible to disambiguate identifiers of the particular component across a networked environment such as a cluster. For example the paths for each of the components and each of the instances can be prefixed by the "my-app@localhost:54321" pair in the form "kogito://my-app@localhost:54321" so that there is no ambiguity even in the extremely unlikely scenario that every component along with their respective randomly generated instance identifiers are identical.

Figure 5:
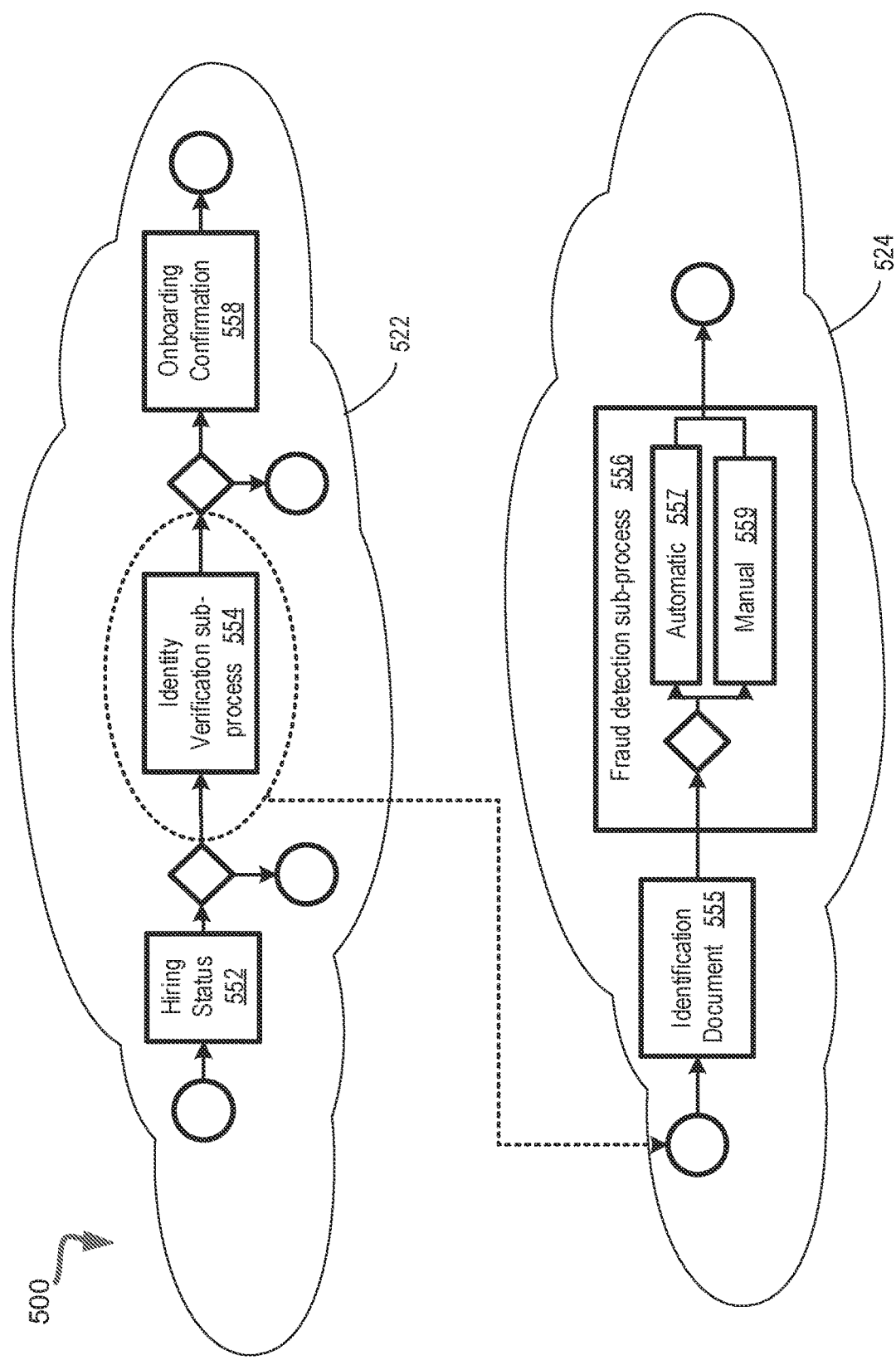
FIG. 5 illustrates a flow diagram of an example distributed process with multiple nested components addressable by the global addressing scheme, in accordance with some implementations.

However, although in the previous example the "host:port" pair is the same for all the global uniform addresses, by prefixing different pairs the different components of an application can be address with each of their respective paths and identifiers even if each of the components were deployed to a different host. This situation is explained with reference to FIG. 5 which illustrates a flow diagram of an example distributed process with multiple nested components addressable by the global addressing scheme, in accordance with some embodiments. FIG. 5 illustrates a flow diagram of an example distributed process with multiple nested components addressable by the global addressing scheme, in accordance with some embodiments. The distributed process 500 of FIG. 5 is similar to the process 450 of FIG. 4A but is deployed in a distributed manner.

More specifically, distributed computing resource 522 can correspond to host 110 of FIG. 1 and be located at one physical location while distributed computing resource 524 can correspond to host 120 and be located at a different physical location that is remote from the physical location of distributed computing resource 522. In some implementations a process can be distributed and executed across two or more distributed computing resources. For example, the execution of hiring process 500 can be distributed between distributed computing resource 522 and distributed computing resource 524 by having some if its constituent components be executed on distributed computing resource 522 while the identity verification sub-process 554 and its constituent components are executed on distributed computing resource 524.

Accordingly, in this scenario, the identity verification sub-process 554 can be a reusable sub-process in the sense that it is not simply defined in the context of its parent hiring process 500 but is independently defined as its own model. This permits the identity verification sub-process 554 to be invoked and executed as part of other processes besides hiring process 500. Therefore, the global uniform addressing scheme can be applied to this distributed scenario as well. For example, the hiring process 500 can include a hiring status sub-process 552 where a check of hiring status occurs. The hiring status sub-process 552 can be followed with an identity verification sub-process 554. The identity verification sub-process can include sub components such as the identification document sub-process 555, which can check an applicant's identification document, and a fraud detection sub-process 556 that can verify that information provided is not fraudulent. Similarly, the fraud detection sub-process 556 can itself have nested sub-components such as the automatic detection task 557 and the manual detection task 559, each respectively implementing a different method of verifying information. Further, the hiring process 500 can include an onboarding confirmation sub-process 558 which may entail the transmission of an onboarding confirmation message to the applicant.

In some implementations, the initial portion of the global uniform address that includes a host address and port via a "host:port" pair can facilitate univocal addressing of the various components of the hiring process even if they are located on remote computing location and within different computing environments. By referencing and corresponding the corresponding "host:port" pair the global uniform addresses of the components can be generated. For the example depicted in FIG. 5, the global uniform addresses of an instance of the hiring process 500 can be "kogito://my-app@localhost:54321/processes/hiring-process/instances/4bc52525-4b73-47ad-9bb8-232f79505901" while the global uniform addresses for an instance of the identity verification sub-process 454 can be "kogito://my-app@localhost:12345/processes/hiring-process/instances/4bc52525-4b73-47ad-9bb8-232f79505901/processes/id-verification/instances//a38947b4-db68-11eb-8d19-0242ac130003". Similarly, since many of the constituent components of the identity verification sub-process 454 are executed at a different computing location 524, the global uniform addresses for an instance of the identification document sub-process 455 can be "kogito://my-app@localhost:12345/processes/hiring-process/instances/4bc52525-4b73-47ad-9bb8-232f79505901/processes/id-verification/instances/a38947b4-db68-11eb-8d19-0242ac130003/workitems/id-document/e2553f0c-db68-11eb-8d19-0242ac130003" while the global uniform addresses for an instance of the fraud detection sub-process 456 can be "kogito://my-app@localhost:12345/processes/hiring-process/instances/4bc52525-4b73-47ad-9bb8-232f79505901/processes/id-verification/instances/a38947b4-db68-11eb-8d19-0242ac130003/processes/fraud-detection/19f852be-db69-11eb-8d19-0242ac130003". In the case that the manual detection option is used, the global uniform addresses for an instance of the manual detection task 459 can be "kogito://my-app@localhost:12345/processes/hiring-process/instances/4bc52525-4b73-47ad-9bb8-232f79505901/processes/id-verification/instances/a38947b4-db68-11eb-8d19-0242ac130003/processes/fraud-detection/19f852be-db69-11eb-8d19-0242ac130003/workitems/manual-detection/2bdc3266-db69-11eb-8d19-0242ac130003". Notably, in some implementations, the "/instances" prefix may be omitted between the component identifier and the instance identifier.

Thus, the global uniform addressing scheme of the various implementations described here includes structured identifiers that contain information relevant to addressing and routing requests for a variety of different application components. Because the addressing scheme includes the types of process models and information about the constituent components of the components of the application it can ensure univocal addressing within both local and distributed computing contexts. It is possible to cause a different component of an application to respond by using a corresponding identifier within the global uniform address with a variety of commands without requiring any extra metadata to be used because all the necessary information is included in the structure of the paths.

FIG. 6 depicts a block diagram of a computer system 600 operating in accordance with one or more aspects of the present disclosure. Computer system 600 may be the same or similar to host 110, client 160, or orchestration platform 140 of FIG. 1, and may include one or more processors and one or more memory devices. In the example shown, computer system 600 may include an identifier module 610, a component instance identification module 615, a global address module 620, and a component invocation module 630.

The identifier module 610 may enable a processor to assign or detect an identifier for components of an application or an instance of a component of an application. The component instance identification module 615 may enable the processor to identify whether an instance of an application component is running on the computer system 600 (i.e., whether the application component is instantiated on computer system 600).

Global addressing module 620 may enable the processor to generate, using a combination of identifiers, a global uniform address for a component of an application. The global uniform address may contain a path that includes one or more of the aforementioned component identifiers and component instance identifiers. Component invocation module 630 can enable the processor to invoke and execute the application components or application component instances using their respective global addresses.

Figure 7:
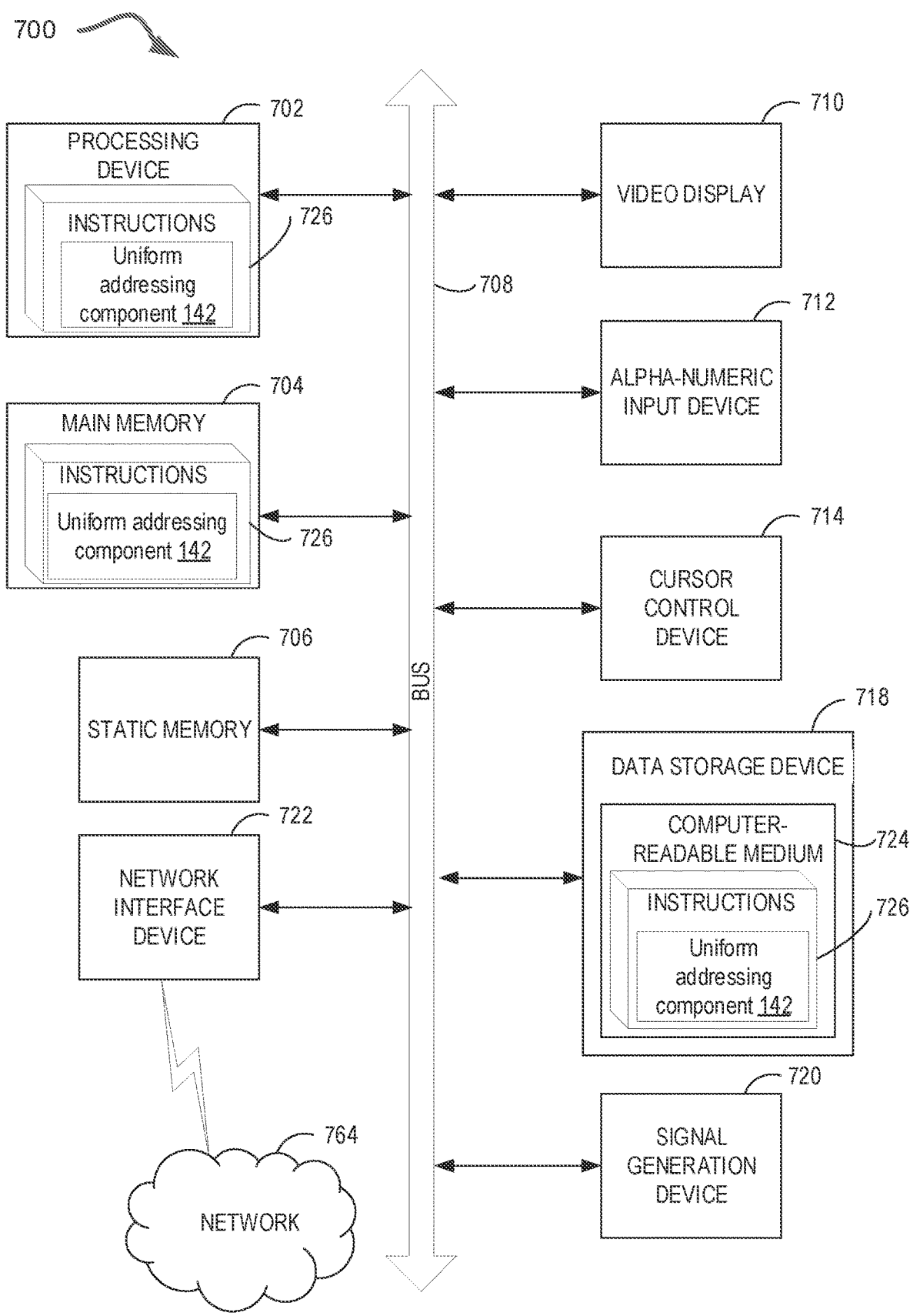
FIG. 7 depicts a block diagram of an illustrative computing device operating in accordance with the implementations of the disclosure.

FIG. 7 depicts a block diagram of a computer system operating in accordance with one or more aspects of the disclosure. In various illustrative examples, computer system 700 may correspond to computer system 100 of FIG. 1. The computer system may be included within a data center that supports virtualization and distributed computing. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720. Data storage device 716 may include a non-transitory computer-readable storage medium 724 on which may store instructions 726 encoding any one or more of the methods or functions described herein (e.g., methods 200, 300), including instructions for implementing the uniform addressing component 142. Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "displaying," "obtaining," "creating," "generating," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
    receiving, by a processing device, a request to execute a first executable component of an application, wherein the first executable component comprises a sequence of executable tasks;
    assigning a component identifier to the first executable component, wherein the component identifier identifies the first executable component from a plurality of executable components of the application;
    determining a component type identifier of the first executable component;
    responsive to a determination that the first executable component is instantiated, assigning a component instance identifier to an instance of the first executable component, wherein the component instance identifier identifies a particular running instance of a plurality of running instances of the first executable component, and wherein each of the plurality of running instances of the first executable component comprises an instance in which at least one task of the sequence of executable tasks is being executed; and
    invoking the first executable component by a global address comprising a sequence of identifiers comprising the component type identifier, the component identifier, and the component instance identifier, wherein the component identifier precedes the component instance identifier in the sequence of identifiers, and wherein the component type identifier precedes the component identifier in the sequence of identifiers.

2. The method of claim 1, further comprising:
    determining whether the first executable component has a sub-component;
    responsive to determining that the first executable component has a sub-component, assigning a sub-component identifier to the sub-component;
    determining a sub-component type identifier of the sub-component;

responsive to a determination that the sub-component is instantiated, assigning a sub-component instance identifier to an instance of the sub-component; and invoking the sub-component by a sub-component global address comprising the sub-component type identifier and at least one of: the sub-component identifier or the sub-component instance identifier.

3. The method of claim 2, wherein the sub-component instance identifier is a unique randomly generated identifier.

4. The method of claim 2, wherein invoking the sub-component comprises using the sub-component global address comprising the sub-component type identifier and the sub-component instance identifier.

5. The method of claim 1, wherein the component instance identifier is a unique randomly generated identifier.

6. A system comprising:
a memory; and
a processor coupled to the memory, the processor configured to:
receive a request to execute a first executable component of an application, wherein the first executable component comprises a sequence of executable tasks;
assign a component identifier to the first executable component, wherein the component identifier identifies the first executable component from a plurality of executable components of the application;
determine a component type identifier of the first executable component;
responsive to a determination that the first executable component is instantiated, assign a component instance identifier to an instance of the first executable component, wherein the component instance identifier identifies a particular running instance of a plurality of running instances of the first executable component, and wherein each of the plurality of running instances of the first executable component comprises an instance in which at least one task of the sequence of executable tasks is being executed; and
invoke the first executable component by a global address comprising a sequence of identifiers comprising the component type identifier, the component identifier, and the component instance identifier, wherein the component identifier precedes the component instance identifier in the sequence of identifiers, and wherein the component type identifier precedes the component identifier in the sequence of identifiers.

7. The system of claim 6, wherein the processor is further configured to:
determine whether the first executable component has a sub-component;
responsive to determining that the first executable component has a sub-component, assign a sub-component identifier to the sub-component;
determine a sub-component type identifier of the sub-component;
responsive to a determination that the sub-component is instantiated, assign a sub-component instance identifier to an instance of the sub-component; and
invoke the sub-component by a sub-component global address comprising the sub-component type identifier and at least one of: the sub-component identifier or the sub-component instance identifier.

8. The system of claim 7, wherein the sub-component instance identifier is a unique randomly generated identifier.

9. The system of claim 7, wherein invoking the sub-component comprises using the sub-component global address comprising the sub-component type identifier and the sub-component instance identifier.

10. The system of claim 6, wherein the component instance identifier is a unique randomly generated identifier.

11. A non-transitory machine-readable storage medium including instructions that, when accessed by a processing device, cause the processing device to:
receive a request to execute a first executable component of an application, wherein the first executable component comprises a sequence of executable tasks;
assign a component identifier to the first executable component, wherein the component identifier identifies the first executable component from a plurality of executable components of the application;
determine a component type identifier of the first executable component;
responsive to a determination that the first executable component is instantiated, assign a component instance identifier to an instance of the first executable component, wherein the component instance identifier identifies a particular running instance of a plurality of running instances of the first executable component, and wherein each of the plurality of running instances of the first executable component comprises an instance in which at least one task of the sequence of executable tasks is being executed; and
invoke the first executable component by a global address comprising a sequence of identifiers comprising the component type identifier, the component identifier, and the component instance identifier, wherein the component identifier precedes the component instance identifier in the sequence of identifiers, and wherein the component type identifier precedes the component identifier in the sequence of identifiers.

12. The non-transitory machine-readable storage medium of claim 11, wherein the instructions further cause the processing device to:
determine whether the first executable component has a sub-component;
responsive to determining that the first executable component has a sub-component, assign a sub-component identifier to the sub-component;
determine a sub-component type identifier of the sub-component;
responsive to a determination that the sub-component is instantiated, assign a sub-component instance identifier to an instance of the sub-component; and
invoke the sub-component by a sub-component global address comprising the sub-component type identifier and at least one of: the sub-component identifier or the sub-component instance identifier.

13. The non-transitory machine-readable storage medium of claim 12, wherein each of the component instance identifier and the sub-component instance identifier is a unique randomly generated identifier.

14. The non-transitory machine-readable storage medium of claim 12, wherein invoking the sub-component comprises using the sub-component global address comprising the sub-component type identifier and the sub-component instance identifier.

\* \* \* \* \*